(12) United States Patent
Franck et al.

(10) Patent No.: US 11,660,862 B2
(45) Date of Patent: May 30, 2023

(54) SYSTEMS AND METHODS FOR PRINTING PATTERNS

(71) Applicant: WISCONSIN ALUMNI RESEARCH FOUNDATION, Madison, WI (US)

(72) Inventors: Christian Franck, Madison, WI (US); Jin Yang, Madison, WI (US); Jialiang Tao, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 213 days.

(21) Appl. No.: 17/024,499

(22) Filed: Sep. 17, 2020

(65) Prior Publication Data
US 2022/0080728 A1 Mar. 17, 2022

(51) Int. Cl.
*B41J 2/13* (2006.01)
*B41J 3/407* (2006.01)
(Continued)

(52) U.S. Cl.
CPC ............. *B41J 2/13* (2013.01); *B29C 64/00* (2017.08); *B29C 64/112* (2017.08); *B29C 64/124* (2017.08); *B29C 64/20* (2017.08); *B29C 64/209* (2017.08); *B29C 64/25* (2017.08); *B41J 3/4073* (2013.01); *B41J 2/04501* (2013.01); *B41J 11/002* (2013.01); *B41J 2202/01* (2013.01)

(58) Field of Classification Search
CPC ........ B41J 3/4073; B41J 2/13; B41J 2202/01; B41J 2/17566; B41J 2002/17569; B41J 2002/17589
See application file for complete search history.

(56) References Cited

U.S. PATENT DOCUMENTS

2013/0307892 A1  11/2013  Byun et al.
2016/0229121 A1*  8/2016  Ilic ................. B29C 64/232
(Continued)

FOREIGN PATENT DOCUMENTS

CN    108519381 A    9/2018
JP    2015160162 A    9/2015

OTHER PUBLICATIONS

International Search Report and Written Opinion dated Jan. 3, 2022 for International Application No. PCT/US2021/050646.
(Continued)

*Primary Examiner* — Kristal Feggins
(74) *Attorney, Agent, or Firm* — Seager, Tufte & Wickhem LLP

(57) ABSTRACT

A system and method for applying patterns to surfaces. A pattern may be applied to a surface of an object using a three-dimensional (3D) printer system. The 3D printer system may include a printer head including an applicator holding material used to form the pattern on the surface, a structure configured to hold a substrate to which the material will be applied, and a controller for adjusting a location of the printer head relative to a surface and initiating applying material from the applicator onto the surface. The applicator may be a syringe with a needle. 3D coordinates at which material is to be applied to a surface to form the pattern may be determined and identified based on a relative location of the substrate and the pattern. The pattern may be a speckle dot pattern used in Digital Image Correlation (DIC) material testing and characterization techniques.

20 Claims, 12 Drawing Sheets

(51) Int. Cl.

| | |
|---|---|
| *B29C 64/25* | (2017.01) |
| *B29C 64/112* | (2017.01) |
| *B29C 64/209* | (2017.01) |
| *B29C 64/124* | (2017.01) |
| *B29C 64/00* | (2017.01) |
| *B29C 64/20* | (2017.01) |
| *B41J 11/00* | (2006.01) |
| *B41J 2/045* | (2006.01) |

(56) References Cited

U.S. PATENT DOCUMENTS

| | | |
|---|---|---|
| 2017/0232733 A1 | 8/2017 | Rupprecht et al. |
| 2019/0271537 A1 | 9/2019 | Kontsos et al. |
| 2020/0304681 A1* | 9/2020 | Morovic .................. H04N 1/52 |

OTHER PUBLICATIONS

Sutton et al; Image Correlation for Shape, Motion and Deformation Measurements: Basic concepts, theory and applications[M]. Boston, MA; Springer-Veriag US, 2009.

International Digital Image Correlation Society, Jones, E.M.C. and Iadicola, M.A. (Eds.) (2018). A Good Practices Guide for Digital Image Correlation, https://doi.org/10.32720/idics/gpg.ed1/print. format.

Dong et al;" A review of speckle pattern fabrication and assessment for digital image correlation[J]." Experimental Mechanics, 57(8): 1161-1181, 2017.

Yang et al; "Smart Digital Image Correlation Patterns Via 3-D Printing,".

Peters et al; "Digital Imaging Techniques in Experimental Stress Analysis," Optical Engineering, vol. 21, pp. 427-431, 1982.

Pan et al; "Two-dimensional digital image correlation for in-plane displacement and strain measurement: a review," Measurement Science and Technology, vol. 20, p. 62001, 2009.

Bar-Kochba, "A fast iterative digital vol. correlation algorithm for large deformations," Experimental Mechanics, vol. 55, pp. 261-274, 2015.

Landauer et al; "A q-factor based digital image correlation algorithm (qDIC) for resolving finite deformations with degenerate speckle patterns," Experimental Mechanics, vol. 58, pp. 815-830, 2018.

Yang et al; "Augmented Lagrangian Digital Image Correlation," Experimental Mechanics, vol. 59, pp. 187-205, 2019.

Gauvin et al; "Image Correlation to Evaluate the Influence of Hygrothermal Loading on Wood," Strain, vol. 50, pp. 428-435, 2014.

Shafaghi et al; "Cyclic Strain Heterogeneity and Damage Formation in Rolled Magnesium Via In Situ Microscopic Image Correlation," Experimental Mechnics, vol. 60, pp. 735-751, 2020.

Özdür et al; "Residual Intensity as a Morphological Identifier of Twinning Fields in Microscopic Image Correlation," Experimental Mechanics, pp. 1-20, Oct. 2020.

Yang et al; "Combining image compression with digital image correlation," Experimental Mechanics, vol. 59, pp. 629-642, 2019.

Turner et al; "Application of digital image analysis to strain measurement at elevated temperature," Strain, vol. 26, pp. 55-59, 1990.

Lionello et al; "An effective procedure to create a speckle pattern on biological soft tissue for digital correlation measurements," Journal of the Mechanical Behavior of Biomedical Materials, vol. 39, vol. 1-8, 2014.

Bornert et al; "Digital Image Correlation," Chapter, In Book: Full-Field Measurements and Identification in Solid Mechanics, pp. 157-190, 2012.

Schreier et al; "Systemic errors in digital image correlation due to undermatched subset shape functions," Experimental Mechanics, vol. 42, pp. 303-310, 2002.

Lionello et al; "A practical approach to optimizing the preparation of speckle patterns for digital-image correlation," Measurement Science Technology, vol. 25, 107001, 2014.

Kammers et al; "Small-scale patterning methods for digital image correlation under scanning electron microscopy," Measurement Science and Technology, vol. 22 (12): 125501, 2011.

Grant et al; "High-temperature strain field measurement using digital image correlation," The Journal of Strain Analysis for Engineering Design, vol. 44, pp. 263-271, 2009.

Blaber et al; "A methodology for high resolution digital image correlation in high temperature experiments," Review of Scientific Instruments, 86(3):035111, 2015.

Bossuyt, "Optimized patterns for digital image correlation," Imaging Methods for Novel Materials and Challenging Applications, vol. 3, pp. 239-248, Springer New York, NY 2013.

Bomarito et al; "Increasing accuracy and precision of digital image correlation through pattern optimization," Optics and Lasers in Engineering, vol. 91: pp. 73-85, 2017.

Bomarito et al; "Development of optimal multiscale patterns for digital image correlation via local grayscale Variation," Experimental Mechanics, vol. 58, pp. 1169-1180, 2018.

Chen et al; "Optimized digital speckle patterns for digital speckle pattern: uniqueness, accuracy, precision and spatial resolution," Opt. Express, vol. 27, pp. 22439-22474, 2019.

Su et al; "Theoretical analysis on performance of digital speckle pattern: uniqueness, accuracy, precision , and spatial resolution," Opt Express, vol. 27, pp. 22439-22474, 2019.

Mathew et al; "A bio-inspired frequency based approach for tailorable and scalable speckle pattern generation," Experimental Mechanics, 2020.

Yang ert al; "Fast adaptive global digital image correlation," In Lamberti, Lin, Furlong, Sciammarella, Reu and Sutton, editors. Advancement of Optical Methods & Digital Image Correlation in Experimental Mechanics, vol. 3, pp. 69-73, Springer, 2019.

Rimoli et al; "On the mesh dependency of cohesive zone models for crack propagation analysis," Conference paper in Collection of Tecnical papers—AIAA/ASME/ASCE/AHS/ASC Structures, Structual Dynamics and Materials Conference—Apr. 2012.

Rimoli et al; "Meshing strategies for the alleviation of mesh-induced effects in cohesive element models," Int J Fract 193, pp. 29-42, (2015). https://doi.org/10.1007/s10704-015-0013-6.

Mazzoleni et al; "Thermo-mechanical toner transfer for high-quality digital image speckle patterns," Optics and Lasers in Engineering, vol. 75, pp. 72-80, 2015.

Chen et al; "A method to transfer speckle patterns for digital image correlation," Measurement Science and Technology, 26:95201,2015.

Landauer et al; "Experimental characterization and hyperelastic constitutive modeling of open-cell elastomeric foams," Jounal of the Mechanics and Physics of Solids, 133:103701,2019.

Dong et al; Development of microscale pattern for digital image correlation up to 1400° C. Optics and Lasers in Engineering, vol. 68, pp. 7-15, 2015.

Koumlis et al; "Drop on demand collodial suspension inkjet patterning for DIC," Experimental Techniques, vol. 43, pp. 137-148, 2018.

Wang et al; "Fabrication of micro-scale speckle patterns and its applications for deformation measurement," Measurement Science and Technology, 23(3):035402,2012.

Scrivens et al; "Development of patterns for digital image correlation measurements at reduced length scales," Experimental Mechanics, vol. 47, pp. 63-67, 2007.

Li et al; "Recent Progress in E-beam Lithography for SEM Patterning," in MEMS and Nanotechnology, vol. 2, pp. 163-166, Springer, New York, 2011.

Walley, et al; "In-Situ Mechanical Testing for Characterizing Strain Localization During Deformation at Elevated Temperatures." Experimental Mechanics, vol. 52, pp. 405-416, 2012.

Hinton et al; "Three-dimensional printing of complex biological structures by freeform reversible embedding of suspended hydrogels." Science Advances, 1:e1500758, 2015.

"Automation systems and integration—Numerical control of machines—Program format and definitions of address words—Part 1: Data format for positioning, line motion and contouring control

(56) References Cited

OTHER PUBLICATIONS systems," Standard ISO 6983-1:2009, International Organization for Standardization, Geneva, CH, 2009.
Zhou et al; "Subpixel displacement and deformation gradient measurement using digital image/speckle correlation," Optical Engineering, vol. 40, pp. 1613-1620, 2001.
Pan et al; "Mean intensity gradient: An effective global parameter for quality assessment of the speckle patterns used in digital image correlation." Optics and Lasers in Engineering, vol. 48, pp. 469-477, 2010.
Patel et al; "Rapid toplogy-based particle tracking for high-resolution measurements of large complex 3D motion fields," Scientific Reports, 8:5581, 2018.
Brakke, "The Surface Evolver," Experimental Mathematics, vol. 1, pp. 141-165, 1992.
Levoy et al; "The Digital Michaelangelo Project: 3D scanning of large statues," In Proceedings of the 27th Annual Conference on Computer Graphics and Interactive Techniques, pp. 131-144, 2000.
Yang et al; "Ultra-long lifetime water bubbles stabilized by negative pressure generated between microparticles," Soft Matter, vol. 13, pp. 8202-8208, 2017.
Bornert et al; "Shortcut in DIC error assessment induced by image interpolation used for subpixel shifting," Optics and Lasers in Engineering, vol. 91, pp. 124-133, 2017.10.1016/j.optlaseng.2016.11.014ff.
Reu et al; "DIC challenge: Developing images and guidelines for evaluating accuracy and resolution of 2D analyses," Experimental Mechanics, vol. 58, pp. 1067-1099, 2018.
Grédiac et al; On the optimal pattern for displacement field measurement: Random speckle and dic, or checkerboard and ISA? Experimental Mechanics, vol. 58, pp. 1067-1099, 2018. 10-1007/s11340-019-00579-2.hal-02462030.
Qi et al; "Mapping the nonlinear crack tip deformation field in soft elastomer with a particle tracking method," Journal of the Mechanics and Physics of Solids, vol. 125: pp. 326-346, 2019.

* cited by examiner

SYSTEMS AND METHODS FOR PRINTING PATTERNS

STATEMENT REGARDING FEDERALLY SPONSORED RESEARCH OR DEVELOPMENT

This invention was made with government support under N00014-18-1-2625 and N00014-21-1-2044 awarded by the NAVY/ONR. The government has certain rights in the invention.

TECHNICAL FIELD

The present disclosure pertains to printing systems, methods, and the like. More particularly, the present disclosure pertains to systems and methods for printing patterns and/or designs on surfaces.

BACKGROUND

Patterns may be applied to surfaces for a variety of reasons. For example, patterns may be applied to surfaces for the purposes of creating art work, applying graphic designs to clothing, applying information, logos, and designs to goods, as part of digital image correlation (DIC) processing, and/or for other suitable purposes. DIC techniques are used in manufacturing and material testing to measure full-field deformations in materials. DIC techniques compare images of specimen patterns before and after deformation to quantitatively infer displacement and strain fields. Example known process for applying patterns to surfaces include, but are not limited to, airbrushing or paint spraying, tattooing or transfer methods, stamping or inkjet printing, spin coating, particle coating or compressed air methods, nano-film remodeling, lithography or focused ion beam processing, scratching, abrasion, etching, and/or other suitable techniques for applying patterns to surfaces. Of the known approaches and systems for pattern manufacturing or techniques (e.g., additive techniques, material reduction techniques, printing techniques, etc.), each has certain advantages and disadvantages.

SUMMARY

This disclosure is directed to several alternative designs for, devices of, and methods of applying patterns and/or designs to surfaces. Although it is noted that pattern application approaches and systems are known, there exists a need for improvement to those approaches and systems.

Accordingly, one illustrative instances of the disclosure may include a method of applying a pattern to a surface of a substrate. The method may include selecting a three-dimensional coordinate for each of one or more locations at which ink is to be applied to a surface of a substrate to achieve a predetermined pattern, adjusting a position of a printer head to a three-dimensional coordinate of a location of the one or more locations, and applying ink to the surface of the substrate at the three-dimensional coordinate using the printer head. The three-dimensional coordinates may be determined based on a location of the surface of the substrate. The ink on the surface of the substrate may have a dimension based on the pattern.

Additionally or alternative to any of the embodiments above, the adjusting a position of a printer head to the three-dimensional coordinate of the location of the one or more locations and the applying the ink to the surface of the substrate at the three-dimensional coordinate may be repeated for each of the one or more locations.

Additionally or alternative to any of the embodiments above, the adjusting a position of the printer head to the three-dimensional coordinate of the location of the one or more locations of the pattern may include adjusting the printer head to x-axis and y-axis coordinates and lowering the printer head to a z-axis coordinate, and the applying the ink to the surface of the substrate at the three-dimensional coordinate may occur when the printer head is adjusted to the x-axis coordinate, the y-axis coordinate, and the z-axis coordinates.

Additionally or alternative to any of the embodiments above, the applying the ink to the surface of the substrate at the three-dimensional coordinate may include applying a predetermined amount of ink to the substrate to achieve the dimension based on the pattern design.

Additionally or alternative to any of the embodiments above, the dimension of the ink on the surface of the substrate may be a radius of a printed ink dot in a range of ten (10) micrometers-ten (10) millimeters.

Additionally or alternative to any of the embodiments above, the pattern may be a speckle dot pattern.

Additionally or alternative to any of the embodiments above, the method may further include determining the speckle dot pattern based on optimization rules for digital image correlation patterns.

Additionally or alternative to any of the embodiments above, the optimization rules for digital image correlation patterns may include a predetermined dot diameter range and a predetermined dot coverage range for the surface of the substrate.

Additionally or alternative to any of the embodiments above, the one or more locations may be locations of one or more dots of the speckle dot pattern and a center position of the one or more dots of the speckle dot pattern may be configured to be distributed on a predetermined area of the surface of the substrate based on optimization rules.

Additionally or alternative to any of the embodiments above, the applying the ink to the surface of the substrate may include applying the ink to a flat surface of the substrate.

Additionally or alternative to any of the embodiments above, the applying the ink to the surface of the substrate may include applying the ink to a non-flat surface of the substrate.

Another illustrative instance of the disclosure may include a computer readable medium having stored thereon in a non-transitory state a program code for use by a computing device, the program code causing the computing device to execute a method of operating a three-dimensional printer system. The method of operating a three-dimensional printer may include identifying a three-dimensional coordinate of a dot of one or more dots of a dot pattern to be applied to a surface of a substrate, adjusting a position of a printer head to the three-dimensional coordinate of the dot of the one or more dots of the dot pattern, and applying ink to the surface of the substrate at the three-dimensional coordinate using the printer head. The ink on the surface of the substrate may have a dimension based on the dot pattern.

Additionally or alternative to any of the embodiments above, the method may further include providing the three-dimensional coordinate for each of the one or more dots of the dot pattern based on a location of a surface of a substrate.

Additionally or alternative to any of the embodiments above, the adjusting the position of the printer head to the three-dimensional coordinate of the dot of the one or more dots of the dot pattern may include adjusting the printer head to an x-axis and y-axis coordinates and lowering the printer head to a z-axis coordinate, and the applying the ink to the surface of the substrate at the three-dimensional coordinate may occur when the printer head is adjusted to the x-axis coordinate, the y-axis coordinate, and the z-axis coordinates.

Additionally or alternative to any of the embodiments above, the method may include raising the printer head from the z-axis coordinate after applying the ink to the surface of the substrate, and for each of the one or more dots of the dot pattern, repeating the adjusting the position of the printer head to the three-dimensional coordinate of the dot of the one or more dots of the dot pattern, the applying the ink to the substrate at the three-dimensional coordinate, and the raising the printer head from the z-axis coordinate after applying the ink to the substrate.

Additionally or alternative to any of the embodiments above, the applying the dot of ink to the substrate at the three-dimensional coordinate may include applying a pre-determined volume of ink to the substrate to achieve the dimension based on the dot pattern.

Additionally or alternative to any of the embodiments above, the applying the ink to the surface of the substrate may include applying the ink to a non-flat surface of the substrate.

Additionally or alternative to any of the embodiments above, the method may further include adjusting a position of the substrate in a z-axis direction when the ink is to be applied to the non-flat surface of the substrate.

Another illustrative instance of the disclosure may include a three-dimensional printing system. The three-dimensional printing system may include a printer head comprising a syringe configured to hold ink, a structure configured to hold a substrate to which the ink from the syringe is to be applied, a processor, and memory configured to store in a non-transitory state instructions executable by the processor. The instructions executable by the processor may cause the processor to adjust a position of the printer head to a three-dimensional coordinate of a dot of one or more dots of a dot pattern to be applied to a surface of the substrate, and apply ink to the surface of the substrate at the three-dimensional coordinate using the printer head. The ink having a dimension on the surface of the substrate based on the dot pattern.

Additionally or alternative to any of the embodiments above, the dimension of the ink on the surface of the substrate may be a radius in a range of ten (10) micrometers-ten (10) millimeters.

The above summary of some example embodiments is not intended to describe each disclosed embodiment or every implementation of the disclosure.

BRIEF DESCRIPTION OF THE DRAWINGS

The disclosure may be more completely understood in consideration of the following detailed description of various embodiments in connection with the accompanying drawings, in which.

Figure 1:
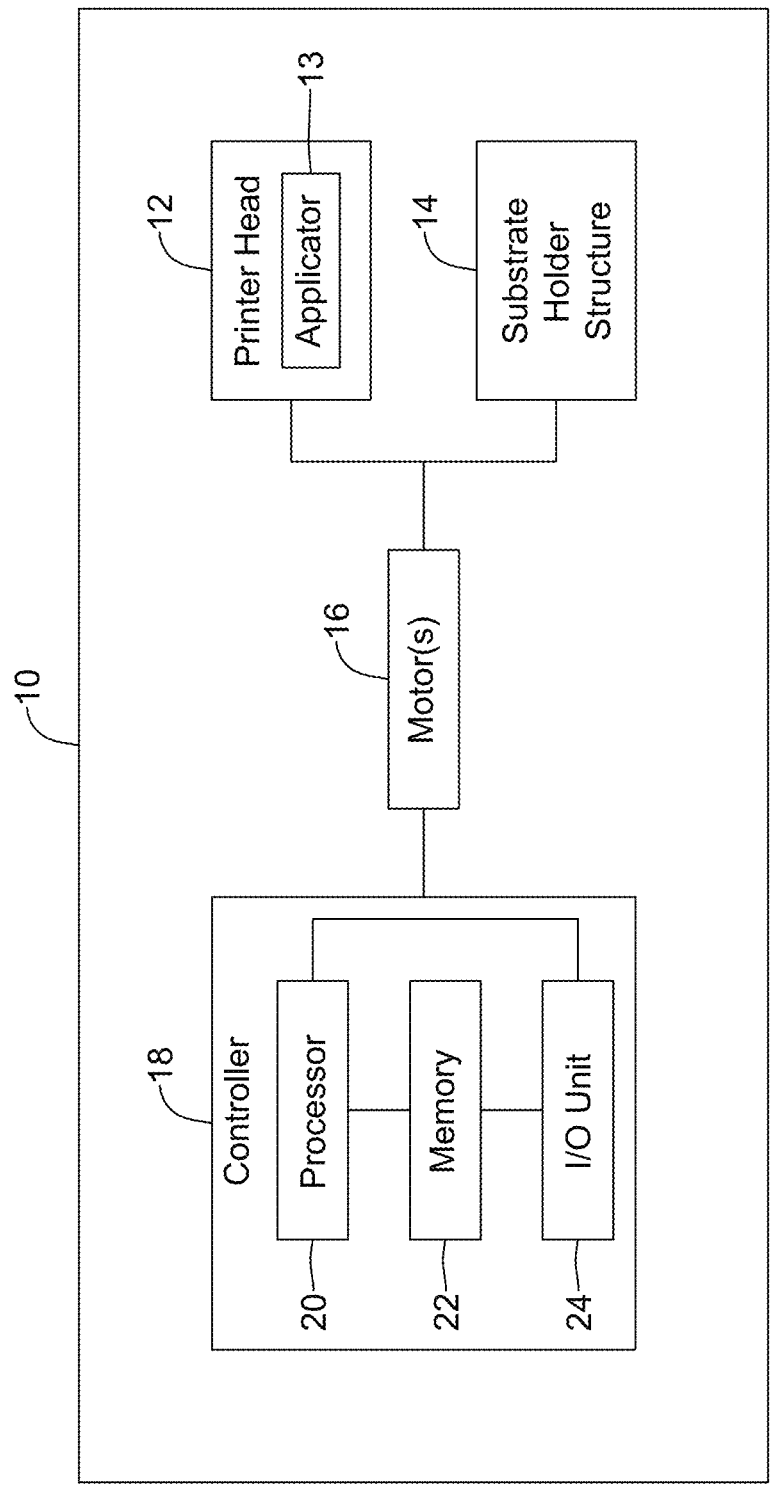
FIG. 1 is a schematic box diagram of an illustrative three-dimensional (3D) printer system.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Patterns may be applied to surfaces using one or more known techniques. Example techniques include, but are not limited to, airbrushing or paint spraying, tattooing or transfer methods, stamping or inkjet printing, spin coating, particle coating or compressed air methods, nano-film remodeling, lithography or focused ion beam processing, scratching, abrasion, etching, and/or other suitable techniques for applying patterns to surfaces. Although three-dimensional (3D) printers known in additive manufacturing for producing 3D objects, 3D printers are not typically used to precisely apply patterns to surfaces (e.g., surfaces of 3D objects and/or other suitable surfaces).

Patterns may be applied to surfaces for a variety of reasons. For example, as discussed above, patterns may be applied to surfaces for the purposes of creating art work, applying graphic designs to clothing, applying information, logos, and designs to goods, as part of digital image correlation (DIC) processing, and/or for other suitable purposes. In some cases, accuracy and/or maintenance of a pattern applied to a surface may be important for its application. For example, when a pattern is applied to clothing, it may be important to ensure the pattern is placed at a desired location and that the pattern is maintained over time as the clothing used and washed.

DIC techniques are used in manufacturing and material testing to measure full-field deformation in materials and/or for other purposes. DIC techniques compare images of specimen patterns before and after deformation to quantitatively infer displacement and strain fields. Compared to other non-contact full-field deformation measurement techniques, DIC has the following advantages: (i) simple experimental setup and specimen preparation; (ii) low requirements in measurement environment; and (iii) wide range of measurement sensitivity and resolution. For DIC experiments, natural texture of materials or speckle patterns applied on the sample surface are necessary to work as a carrier of deformation information. Not all materials have sufficient natural textures for a DIC test.

Any suitable techniques may be utilized in DIC processing of images capturing a load applied to an object with a pattern printed thereon. In some cases, known DIC image tracking algorithms may be utilized to accurately measure deformations. Example DIC image tracking algorithms include, but are not limited to, fast Fourier transform (FFT)-based or inverse compositional Gauss-Newton (ICGN), local subset method, finite element (FE)-based global method, fast iterative DIC (FIDIC) method, augmented Lagrangian DIC (ALDIC) method, etc.

A quality of patterns applied to surfaces of objects for use in DIC techniques may have significant effects on an accuracy of computed deformations of the object. A quality pattern for use in DIC techniques should meet these requirements: (i) high contrast—varying grayscale intensities and large intensity gradients; (ii) randomness—non-repetitive patterns to facilitate the uniqueness of full-field displacement results; (iii) isotropy—no directionality in the pattern; (iv) stability—a good speckle pattern is expected to tightly adhere to the sample surface and deform with the sample together. To achieve these requirements, a desired pattern must be accurately and precisely applied to a surface.

Example known processes or techniques for applying patterns to surfaces for use in DIC processing include, but are not limited to, airbrushing or paint spraying, tattooing or transfer methods, stamping or inkjet printing, spin coating, particle coating or compressed air methods, nano-film remodeling, lithography or focused ion beam processing, scratching, abrasion, etching, and/or other suitable techniques for applying patterns to surfaces. With the use of these known processes or techniques for applying patterns to surfaces of objects used in a DIC technique, it is difficult or not possible to precisely control and apply a uniformly distributed pattern (e.g., a uniformly distributed random speckle dots pattern and/or other suitable uniformly distributed pattern based on optimization rules) on a surface (e.g., a flat surface or a non-flat surface (e.g., a curved or angled surface relative to a horizontal surface)). Similar issues arise when trying to precisely control and apply patterns to surfaces for uses in applications other than in DIC processing.

Example downsides to the above-discussed known processes or techniques for applying patterns to surfaces vary. When printing speckle dots of a pattern using an airbrush painting method, the printed speckle dots may not be robust and are affected by many factors such as ink viscosity, nozzle size, and spray distance, while a density of speckle dots may be non-uniform due to uneven spraying time. Similarly, it is difficult to precisely control pattern quality using coating or scratching based processes and techniques. Further, it is difficult and/or inconvenient to implement printing a designed pattern using lithography printing processes and techniques on macroscale applications and such techniques have limited applicability to non-flat surface. Similarly, it is difficult to apply designed patterns to a non-flat surface using stamp and/or inkjet printing processes and techniques. Further, tattoo and/or transfer processes and techniques suffer from unstable pattern transfer ratios.

To produce quality patterns on flat and/or non-flat surfaces of an object, a 3D printer may be utilized that allows for adjustable and precise control of pattern placements in an automated manner. A suitable 3D printer for applying patterns to surfaces of an object may include a printer head configured to be adjustable in three dimensions (e.g., x-axis, y-axis, and z-axis). When a 3D printer is used for applying patterns to surfaces of an object, the printer head may be originally equipped with or retrofitted with a syringe filled and/or fillable with ink to be used for creating the pattern rather than an additive manufacturing extrusion tip typically found in 3D printers.

Three-dimensional printers with an ink filled syringe printer head or other suitable printer head outputting ink may be controlled in any suitable manner. In some cases, such 3D printers configured to output (e.g., extrude, etc.) ink may be controlled using modified G-codes that are typically used to control printing of 3D printers. For example, the G-codes may be configured to adjust the printer head to desired positions for creating a pattern on a surface of an object and outputting a desired volume of ink (e.g., volume of ink droplets) at each position to create a desired pattern. In a DIC pattern application, the G-code or other coded data files may be compiled with user-directed assigned speckle dot sizes and positions, which may be customized based on the DIC users' applications.

Using such a 3D printer system to produce a pattern on a surface of an object for DIC analysis may allow for creating speckle dots having radii over a wide range of O(10) μm to O(10) mm depending on the applied syringe diameter and designed G-codes, and final DIC tracked deformations may have an accuracy on the order of $O(10^{-2})$ pixels and $O(10^{-4})$ in measuring displacements and strains, respectively. Additionally, using the 3D printer system technique for applying patterns to surfaces may facilitate tracking larger and heterogeneous deformation.

Turning to the figures, FIG. 1 depicts a schematic box diagram of a 3D printer system 10. The 3D printer system 10 may include, among other components and features, a printer head 12, one or more applicators 13 configured to output ink or other suitable marking material to a surface of an object, an object or substrate holder 14, one or more motors 16 configured for adjusting positions of one or both of the printer head 12 and the substrate holder 14 and/or output material from the applicator 13, and a controller 18 in communication with the motor(s) 16. The controller 18, in some cases, may be configured to control the operation of the 3D printer system 10 by establishing and/or outputting control signals to the motor(s) 16 to adjust positions of one or both of the printer head 12 and the substrate holder 14 and/or initiate and/or adjust output from the applicator 13 to form a desired pattern on a surface of a substrate.

The controller 18 may be any suitable computing device configured to process data of or for the 3D printer system 10. The controller 18 may be a component of, or otherwise included in, the 3D printer system 10, as depicted in FIG. 1. Additionally or alternatively, the controller 18 or a portion of the controller 18 may be a component separate from and in communication with the 3D printer system 10.

In some cases, the controller 18 may communicate with a remote server or other suitable computing device and/or may be included in a remote server or other suitable computing device. When the controller 18, or at least a part of the controller 18, is a component separate from a structure of the 3D printer system 10, the controller 18 may communicate with electronic components of the 3D printer system 10 over one or more wired or wireless connections or networks (e.g., local area networks (e.g., LAN) and/or wide area networks (WAN)).

The illustrative controller 18 may include, among other suitable components, one or more processors 20, memory 22, and/or one or more I/O units 24. Example other suitable components of the controller 18 that are not specifically depicted in FIG. 1 may include, but are not limited to, communication components, a user interface, a touch screen, a display screen, selectable buttons, a housing, and/or other suitable components of a controller. As discussed above, one or more components of the controller 18 may be separate from the 3D printer system 10 and/or incorporated into the 3D printer system 10, as depicted in FIG. 1.

The processor 20 of the controller 18 may include a single processor or more than one processor working individually or with one another. The processor 20 may be configured to execute instructions, including instructions that may be loaded into the memory 22 and/or other suitable memory. Example components of the processor 20 may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 22 of the controller 18 may include a single memory component or more than one memory component each working individually or with one another. Example types of memory 22 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 22 may be or may include a non-transitory computer readable medium. The memory 22 may include instructions stored on transitory and/or non-transitory computer readable medium that may be executable by the processor 20 to cause the processor to perform one or more of the methods and/or techniques described herein.

Figure 2:
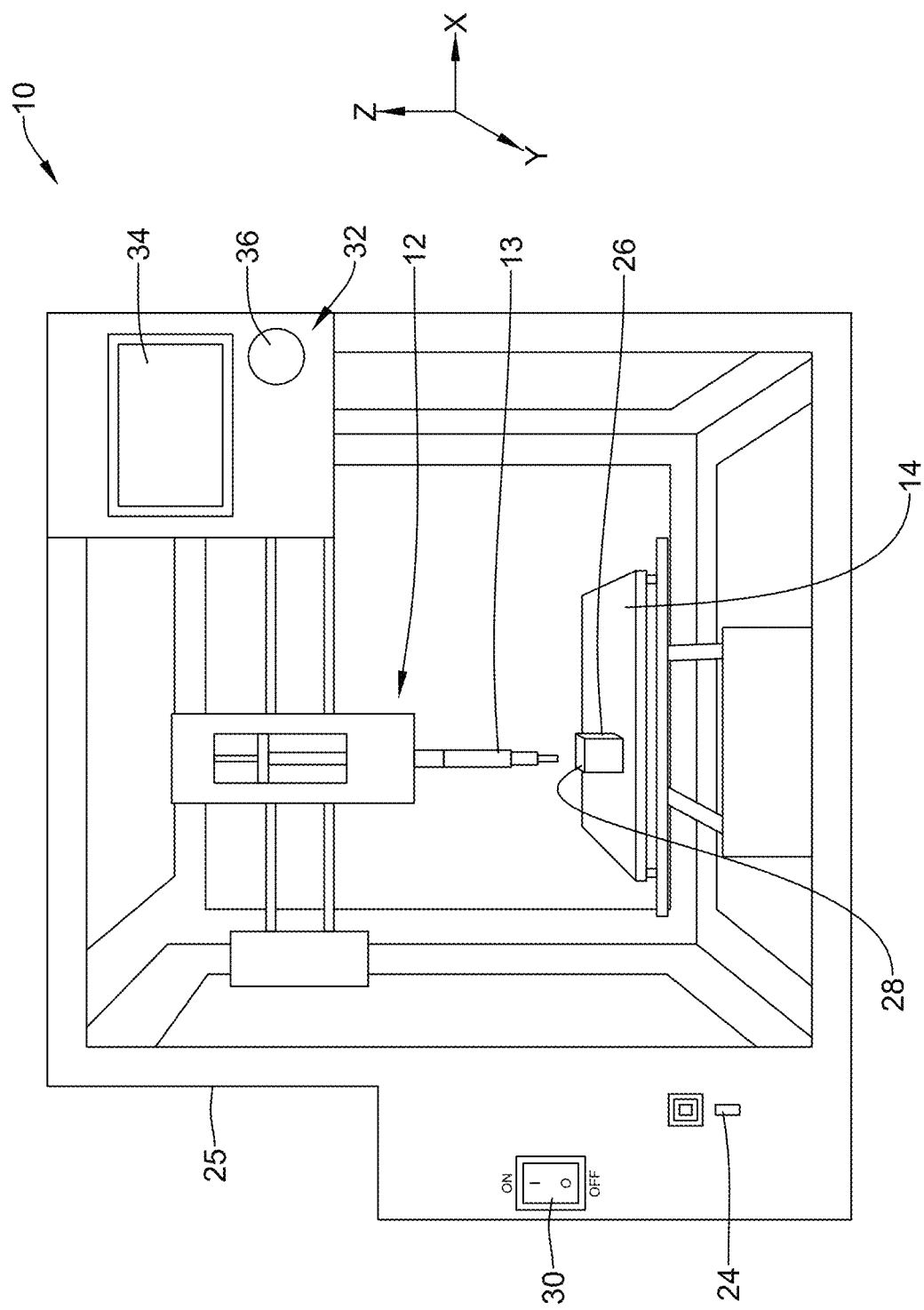
FIG. 2 is a schematic diagram of an illustrative 3D printer system.

The I/O units 24 of the controller 18 may include a single I/O component or more than one I/O component each working individually or with one another. Example I/O units 24 may be or may include any suitable types of communication hardware and/or software including, but not limited to, communication ports configured to communicate with electronic components of the 3D printer system 10, and/or configured to communicate with other suitable computing devices or systems. Example types of I/O units 24 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports FIG. 2 depicts a schematic diagram of the 3D printer system 10. The 3D printer system 10 depicted in FIG. 2 may include a housing 25, the printer head 12, the applicator 13, the substrate holder 14, an I/O unit 24, a power button 30 for controlling power to electronic components of the 3D printer system 10, and a user interface 32. As discussed above, the 3D printer system 10 may include one or more additional or alternative components or features. An example 3D printer that may be used as or part of the 3D printer system 10 is a LULZBOT™ mini 3D printer, but any suitable 3D printer may be utilized.

The user interface 32 may include a display 34, a control knob 36, and/or other suitable features. The display 34 may be any suitable display. Example displays include, but are not limited to, touch screen displays, non-touch screen displays, liquid crystal display (LCD) screens, light emitting diode (LED) displays, and/or other suitable display types. The control knob 36 may be used to adjust (e.g., by rotating the control knob 36 and/or by interacting with the control knob 36 in one or more other suitable manners) values and/or adjust or scroll among selection options displayed on the display 34. In some cases, the control knob 36 may be used to select (e.g. by pressing the control knob 36 and/or by interacting with the control knob 36 in one or more other suitable manners) one or more options displayed on the display 34. In addition to or as an alternative to the display 34 and the control knob 36, other suitable input/output components or units (e.g., I/O units 24) may be part of the user interface 32.

The input/output unit 24 depicted on the housing 25 in FIG. 2 may be input port. The input port may be configured to receive via a wireless or wired connection G-codes or other suitable instructions from a remote computing device (e.g., having components similar to or different than the controller 18) and understandable by the computing components of the 3D printer system 10.

Further, FIG. 2 depicts an object 26 (e.g., substrate) on the substrate holder 14 for receiving a pattern produced by the 3D printer system 10. In the configuration depicted, ink or other material may be outputted from the applicator 13 to a surface 28 of the object 26 to accurately form a precisely defined pattern in response to instructions for the 3D printer system 10 (e.g., g-codes or other suitable instructions).

Although a 3D printer system 10 may be originally configured to accurately apply a pattern to a surface of an object, as discussed herein, a 3D printer system originally configured for additive manufacturing processes may be retrofitted with the an applicator 13 configured to output ink or other pattern forming material at precise locations and in precise amounts to accurately apply a pattern to a surface of an object. In one example of retrofitting a 3D printer head used in additive manufacturing techniques with a printer head 12 configured for applying a pattern to a surface of an object, a built-in mount of a step motor in the printer may be removed, along with fans, heaters, and extruder filament. A first mount may be installed on an x-axis carriage, where the first mount may include a gear configured to engage a gear of a stepper motor such that core math used for printing does not change after the retrofit. In the example, a second mount may be attached to the printer head 12 that includes a gear configured to engage the gear of the stepper motor. The second mount may be configured to hold a screw and a syringe with a needle having a desired diameter (e.g., about 80 micrometers (µm)-about 150 µm and/or other suitable diameter). The gear of the second mount may be connected to the screw.

A syringe having a plunger may be filled with ink or other material to be used for making a pattern on a surface of an object. After, during, or before filling the syringe, the screw may be connected to the plunger of the syringe (e.g., the applicator 13). In some cases, a mount may connect the syringe to the printer head 12. To apply ink or other suitable material to a surface of an object, the screw may be rotated to cause longitudinal, axial movement of the plunger and output ink or other suitable material to be outputted (e.g., extruded) from the syringe.

When retrofitted and operated as discussed, a position of the stepper motor may be controlled by the x-axis carriage and the stepper motor may be a core device used to rotate the screw to depress the plunger of the syringe and execute outputting of material from the syringe. Further, the object receiving the pattern may be kept fixed on the substrate holder structure 14 and the 3D printer head motions may be controlled by an inputted G-code file (e.g., a Pronterface file and/or other suitable file). The retrofitting and process thereof may be executed in different suitable manners.

An illustrative benefit of using the 3D printing system 10 to print patterns (e.g., for DIC techniques and/or other suitable techniques) may be that printer motions and printed patterns can be quantitatively controlled by a designed G-code, which are already used in computer-aided manufacturing and may be configured to be tailored to 3D printers. A further illustrative benefit may be that the 3D printing system may be used to accurately print patterns on both of flat surfaces (e.g., horizontal surfaces) and non-flat surfaces (e.g., curved or angled surfaces relative to a horizontal surface and/or plane).

G-code files may have at least three parts: a start part, a main body part, and an end part. In the start part, coordinates of start extruder positions (x, y, z) may be reset to zero (e.g., 0, 0, 0). Further, in the start part, the G-code of the 3D printer system 10 may be reset to allow cold extrusion, as opposed to the hot extrusion typically used when a 3D printer is used in additive manufacturing. The main body part of G-code may be configured to move the printer head 12 to various positions at which ink and/or other suitable material may be outputted from the applicator 13 and to output a certain volume of ink or other suitable material at the prescribed positions onto the surface 28 of the object 26. The end part of G-code may be configured to withdraw the applicator 13 from the surface 28 and turn off the motors of the 3D printer system 10 after the pattern is fully applied to the surface 28.

Figure 3:
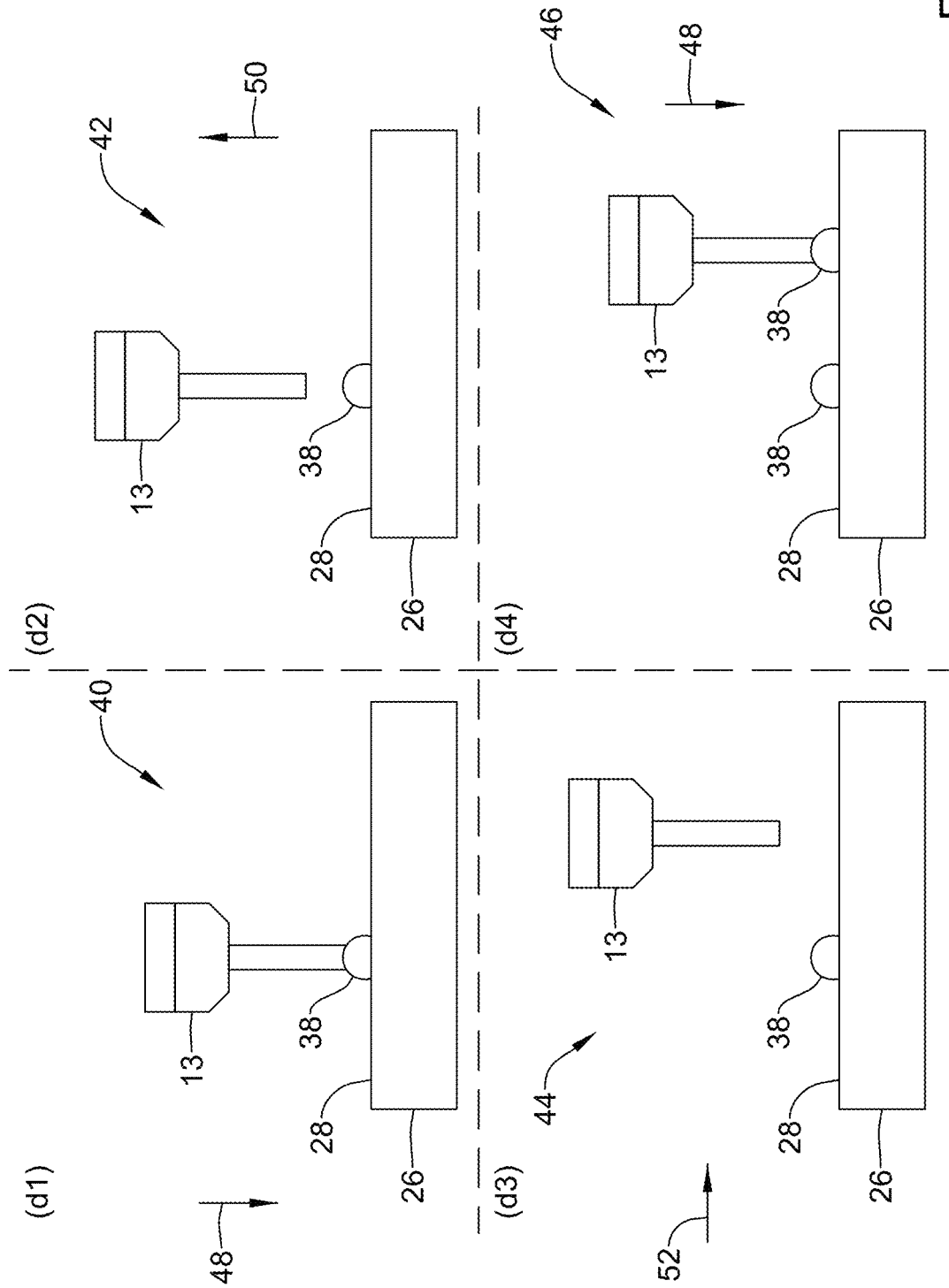
FIG. 3 is a schematic diagram of an illustrative method of applying a material to a surface.

FIG. 3 depicts a schematic diagram of illustrative steps (e.g., 40, 42, 44, and 46) of applying dots of ink or other suitable material 38 to the surface 28 of the object 26, which may or may not be executed by a controller (e.g., the controller 18 and/or other suitable controller) of a 3D printer system (e.g., the printer system 10 and/or other suitable printer system). At step 40, once at a location to which a dot of a pattern is to be applied, the applicator 13 (e.g., a syringe and needle combination and/or other suitable applicator) may be moved in the direction of arrow 48 (e.g., in a down-direction) and a volume of ink or other suitable material 38 may be applied to the surface 28 of the object 26. At step 42, after the volume of ink or other suitable material 38 has been applied to the surface 28, the applicator 13 may be moved in the direction of arrow 50 (e.g., in an up-direction) in preparation of moving the application to a further location at which a volume of ink or other suitable material 38 is to be applied. As shown at step 44, the applicator 13 may be moved in the direction of arrow 52 (e.g., a lateral or horizontal direction) to the further location at which a volume of ink or other suitable material 38 is to be applied. At step 46, applicator may be moved in the direction arrow 48 and the volume amount of ink or other suitable material for the further location may be applied to the surface 28 of the object 26. Steps 40, 42, 44, 46 may be repeated until a predetermined pattern has been applied to the surface.

A volume amount of ink or other suitable material 38 may be any suitable amount of ink or other suitable material 38. For example, the volume of ink or other suitable material 38 to be applied to the surface 28 may be the same volume amount or a different volume as a volume amount of ink or other suitable material 38 that is applied at a previous location. In some cases, the volume amount of ink to be outputted at a location may be adjustable and precisely set, determined, or otherwise configured to achieve a dot or portion of a pattern on a surface having a dimension prescribed by the pattern. The configuration of the controller 18, the motor(s) 16, and/or the applicator 13 facilitate accurately outputting the determined or set amounts of ink or other suitable material 38.

The ability to move the printer head 12 and/or applicator 13 in three dimensions, while controlling a volume amount of ink or other suitable material discharged from the applicator, according to a prescribed pattern facilitates applying patterns to surfaces in an adjustable and precise manner not addressed by previous known techniques for applying patterns to surfaces. Further, due to the three-dimensional movement of the printer head 12 and the applicator 13 and/or the precise control of ink or other suitable material from the applicator 13, designed patterns may be accurately and precisely applied to flat surfaces and non-flat surfaces.

Figure 4:
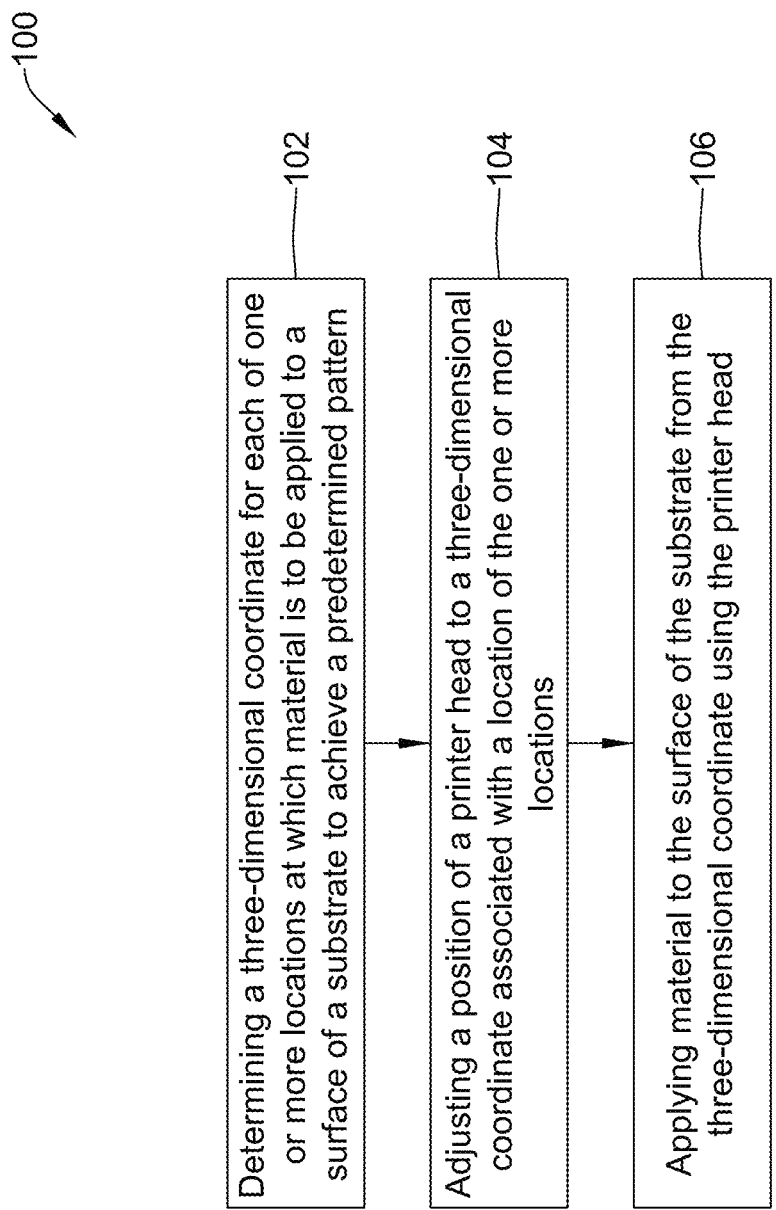
FIG. 4 is a schematic flow diagram of an illustrative method of applying a pattern to a surface.

FIG. 4 depicts an illustrative method 100 of applying a pattern to a surface (the surface 28 and/or other suitable surface) of a substrate (e.g., the object 26 and/or other suitable substrate) using a 3D printer system (e.g., the 3D printer system 10 and/or other suitable 3D printer system). The method 100 may include determining or otherwise selecting 102 3D coordinates for each of one or more locations at which material (e.g., the ink or other suitable material 38 and/or other suitable pattern forming material) is to be applied to a surface of a substrate to achieve a predetermined pattern. In some cases, determining or selecting 3D coordinates for locations at which material is to be applied to a surface may include a computing device (e.g., the controller 18 and/or other suitable computing device) analyzing a predetermined pattern, a 3D representation (e.g., a 3D image or other suitable 3D representation) of the object having the surface to which the pattern is to be applied, a location of the surface of the substrate relative to the 3D printer system 10, configuration of the surface to which the pattern is to be applied (e.g., as discussed in greater detail below with a DIC application example), and/or a location of the object on an object holder (e.g., the substrate holder 14 and/or other suitable object holder).

In some cases, the x-coordinate and the y-coordinate of the 3D coordinates may be locations at which a pattern is to be applied to a surface and the z-coordinate may be a vertical location from which an applicator (e.g., the applicator 13 and/or other suitable applicator) may output material for forming the pattern on the surface, but this is not required. In one example, the printer head may be adjusted to an x-coordinate and a y-coordinate in a same plane and the printer head or at least the applicator, may be lowered to a vertical location at which material may be outputted from the applicator. After outputting the material, the printer head and/or applicator may be raised, as discussed with respect to FIG. 3. The x-coordinate, the y-coordinate, and the z-coordinate may be coordinates of and/or relative to an x, y, z coordinate system of the 3D printer system 10, but this is not required.

After 3D coordinates are determined or selected for at least one of the one or more locations at which material is to be applied to a surface of a substrate, a position of a printer head (e.g., the printer head 12 and/or other suitable printer head) may be adjusted 104 to a determined or selected 3D coordinate of a location of the one or more locations. In some cases, a controller (e.g., the controller 18 and/or other suitable controller) may output control signals to one or more motors (e.g., the motor(s) 16 and/or other suitable motors) to adjust the position of the printer head in up to three (3) dimensions. The control signals may take the form of or be responsive to G-codes, as discussed herein, and/or other suitable computer readable instructions.

At the 3D coordinate to which the printer head is adjusted, material may be applied 106 to the surface of the substrate from the applicator to form a dot or otherwise a portion of the pattern on the surface. The formed dot may have a desired size based on the pattern to be applied to the surface.

In operation, the controller of the 3D printer system may output control signals to one or more motors (e.g., a stepper motor of the motors 16 and/or one or more other suitable motors) to cause the motor to actuate to output material from the applicator. The control signals may take the form of or be responsive to G-codes, as discussed herein, and/or other suitable computer readable instructions that may specify a volume amount of material to be outputted from the applicator.

FIG. 3, as discussed above, depicts an example of adjusting 104 a printer head to a 3D coordinate of a location of the one or more locations at which material is to be applied for forming the pattern and applying 106 material to the surface to form the pattern. The adjusting 104 the printer head and applying 106 the material to the surface may be repeated until a predetermined or desired pattern is formed on the surface.

Figure 5:
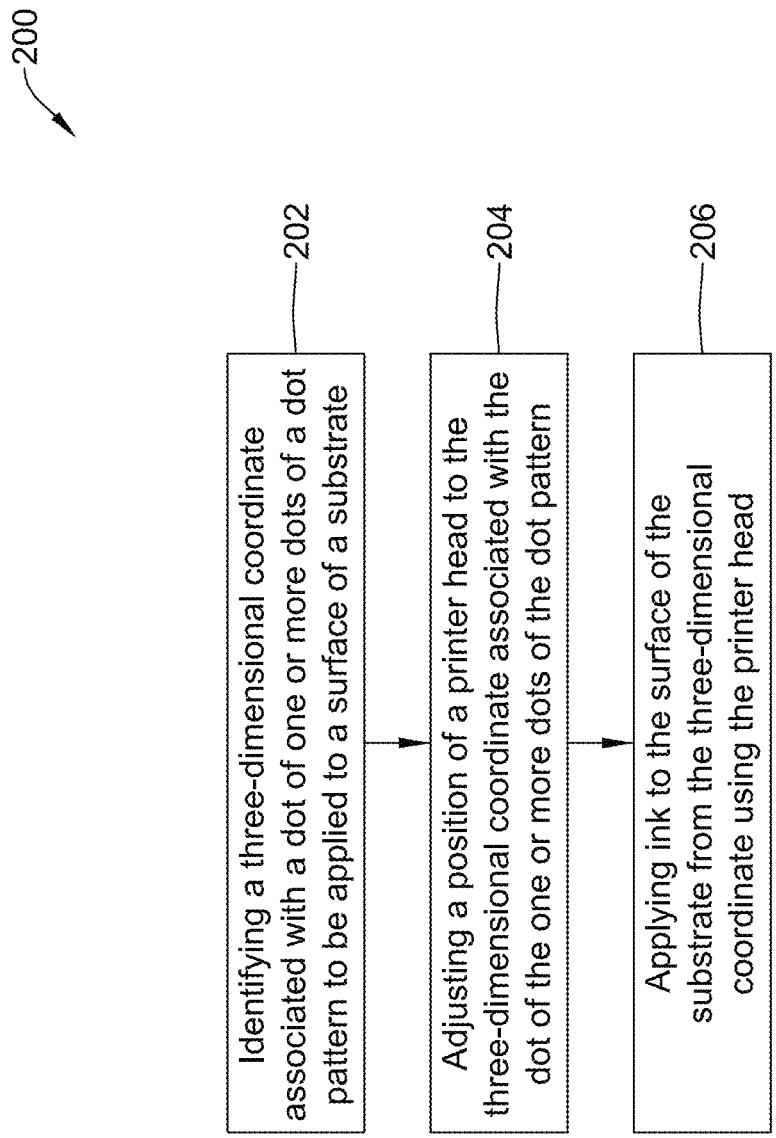
FIG. 5 is a schematic flow diagram of an illustrative method of applying ink to a surface.

FIG. 5 depicts an illustrative method 200 of operating a 3D printer system (e.g., the 3D printer system 10 and/or other suitable 3D printer system) applying a dot pattern to a surface (e.g. the surface 28 and/or other suitable surface) of a substrate (e.g., the object 26 and/or other suitable substrate). The method 200 may include identifying 202 a 3D coordinate for a dot of one or more dots of a dot pattern to be applied to the surface. In some cases, the 3D coordinate may be identified by or using a controller (e.g., the controller 18 and/or other suitable controller) of the 3D printer system from a set of coordinates in a main part of G-code provided to the controller and identifying the 3D coordinates for some or all of the dots configured to form the pattern.

In addition to identifying the 3D coordinate of a dot, a volume amount of ink to be outputted from an applicator (e.g., the applicator 13 and/or other suitable applicator) may be identified. In some cases, the volume amount of ink may be identified from the main part of the G-code identifying volume amounts for some or all of the dots configured to form the pattern.

Once a 3D coordinate for a dot is identified, a position of a printer head (e.g., the printer head 12 and/or other suitable printer head) of the 3D printer system may be adjusted 204 to the 3D coordinate identified. In some cases, the controller may output control signals to one or more motors (e.g., the motor(s) 16 and/or other suitable motors) to move the position of the printer head to the 3D coordinate identified by adjusting the position of the printer head in up to three (3) dimensions. The control signals may take the form of or be responsive to G-codes, as discussed herein, and/or other suitable computer readable instructions.

At the 3D coordinate to which the printer head is adjusted, ink may be applied 206 to the surface of the substrate from the applicator. A predetermined volume amount of ink may be applied to the surface. In some cases, the predetermined volume amount of ink to be applied to the surface of the substrate may be configured to produce a dot having a dimension based on a predetermined dot pattern. In one example, the dimension based on the dot pattern may be a predetermined radii, a predetermined diameter, a predetermined surface area, a predetermined circumference, and/or other suitable dimensional parameter value of a related portion of the ink in contact with the surface.

Figure 6:
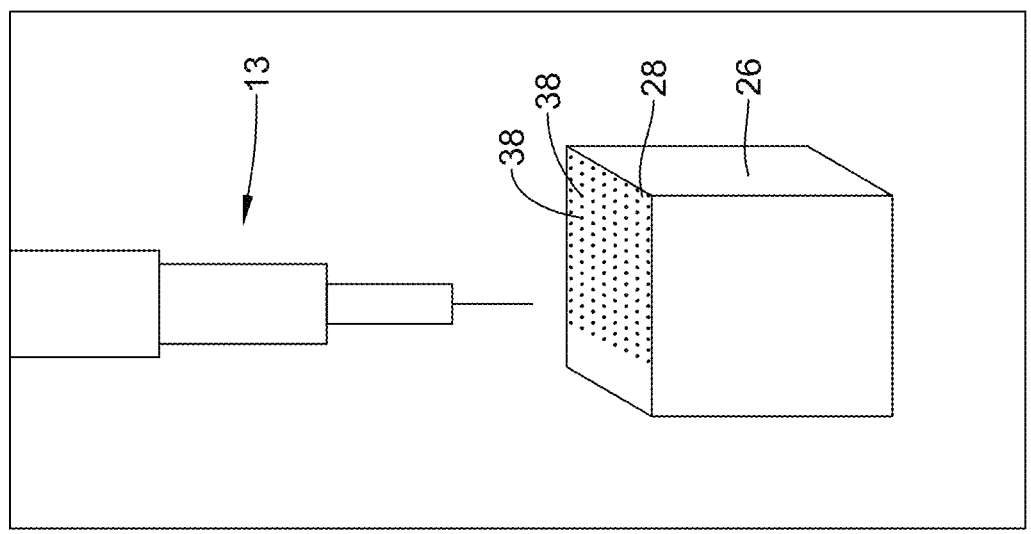
FIG. 6 is a schematic diagram of an illustrative pattern applied to a flat surface.
Figure 7:
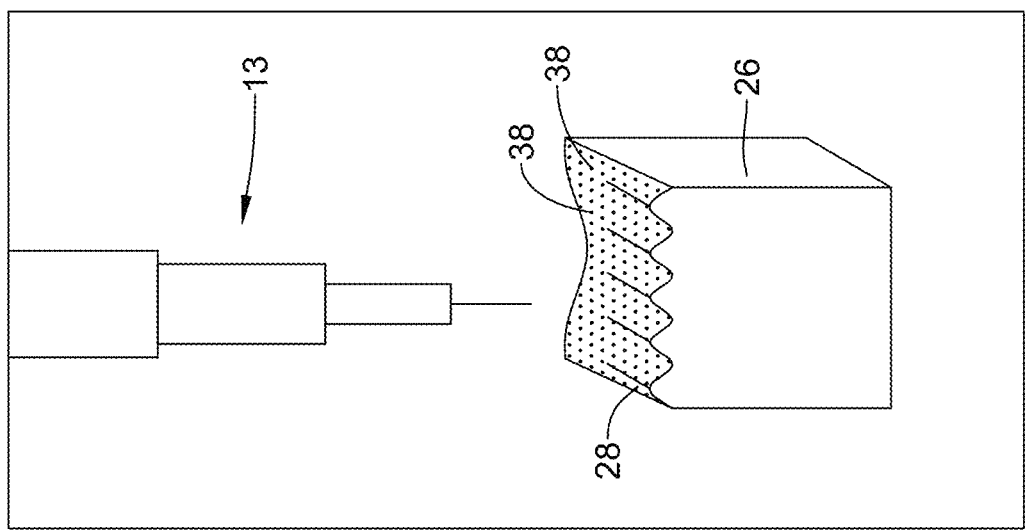
FIG. 7 is a schematic diagram of an illustrative pattern applied to a non-flat surface.

FIG. 6 depicts dots of ink 38 applied to the surface 28 of the object 26 from the applicator 13 of the 3D printer system 10, where the surface 28 which the dots of ink 38 are applied is a flat surface. FIG. 7 depicts dots of ink 38 applied to the surface 28 of the object 26 from the applicator 13 of the 3D printer system 10, where the surface 28 to which the dots of ink 38 are applied is a non-flat surface.

In operation, the controller of the 3D printer system may output control signals to one or more motors (e.g., a stepper motor of the motors 16 and/or one or more other suitable motors) to cause the motor to actuate to output material from the applicator. In one example where a screw is in communication with the motor and a plunger in an ink-filled syringe, actuation of the motor may cause rotation of the screw, which may result in longitudinal movement of the plunger to cause a predetermined volume of ink to be extruded from the syringe and onto the surface. The control signals may take the form of or be responsive to G-codes, as discussed herein, and/or other suitable computer readable instructions that may specify a volume amount of material to be outputted from the applicator.

The 3D coordinates and/or volume amount of ink and/or other suitable material to be outputted from the applicator may be determined or selected in any suitable manner, including, for example, as discussed above with respect to FIG. 4. In some cases, the configuration of a pattern, the 3D coordinates for each application of ink or other suitable material, and/or the volume amount of ink to be outputted from the applicator may be based on one or more rules for configuring the pattern, which may be dependent on the purpose of applying the pattern to the surface.

In one example, when printing a speckle dot pattern on a surface to be used in DIC processing, the configuration (e.g., the 3D coordinates and/or volume amount of ink) of each dot of the speckle dot pattern may be determined or selected based on a set of rules (e.g., optimization rules of digital correlation patterns and/or other suitable rules). In an example of optimization rules of digital correlation patterns, the optimization rules may set forth a dot size (e.g., a predetermined dot diameter range and/or other suitable values related to dot size), a dot density (e.g., a predetermined dot coverage range for an image and/or other suitable values related to dot density on the surface or image), and/or other suitable parameter values related to the patterns. Although other values are contemplated, an example range of a dot diameter in optimization rules may be about 2.5 pixels (px) to about 5 px and/or one or more other suitable ranges. In some cases, an example range of a dot radius may be about 10 µm to about 1 mm. Although other values are contemplated, an example range of image coverage area for dots provided in optimization rules may be about 40% to about 70% of image coverage area. A further optimization rule may relate to how locations and sizes of dots in speckle dot pattern are determined or selected. In one example, a center of each dot may be randomly distributed on a predetermined area of the surface (e.g., generated from Poisson-disc sampling and/or other suitable random location generation technique) to ensure uniqueness of the DIC processing results. Example systems for generating random distributions and ensuring uniqueness of the DIC processing results are discussed in M. Patel, S. E. Leggett, A. K. Landauer, I. Y Wong, and C. Franck. Rapid, topology-based particle tracking for high-resolutions measurements of large complex 3D motion fields. Scientific Reports, 8:5581, 2018, and Y. Su, Z. E. Gao, Z. Fang, Y. Liu, Y. R. Wang, Q. C. Zhang, and S. Q. Wu. Theoretical analysis on performance of digital speckle pattern: uniqueness, accuracy, precision, and spatial resolution. Opt. Express, 24:22439-22474, 2019, which are both hereby incorporated by reference in its entirety for all purposes.

When creating a speckle dot pattern using the 3D printer system 10, each individual speckle dot may be printed by outputting (e.g., extruding, etc.) a droplet with a certain volume amount from the applicator 13. The size (e.g., diameter, radius, contact area, contact angle, etc.) may be predicted or determined by a model to prepare input G-code files. In the model, the size and shape of the printed speckle dot may depend on a contact angle (e.g., angle A in FIG. 8, where box 58 depicts a contact angle A of 45° and box 60 depicts a contact angle A of 90°) between the ink and the surface to which the ink is applied, an outputted volume amount, and a slope of the sample top surface.

In one example of when a dot pattern is to be printed on a flat sample surface (e.g., a surface in a horizontal plane), where each dot pattern may be expected to have a perfect or near perfect round shape and its radius, r, may be the radius of a bottom contact area between the ink and the surface to which the ink is applied. The following is an equation for determining the radius, r, of the dot:

$$r = \left[\left(\frac{3\sin^3\theta}{\pi(2+\cos\theta)(1-\cos\theta)^2}\right)V\right]^{1/3} \quad (1)$$

where, θ is the contact angle between the ink and the surface to which the ink is applied and V is the volume amount of ink to print a single dot that is outputted from the applicator 13.

Figure 8:
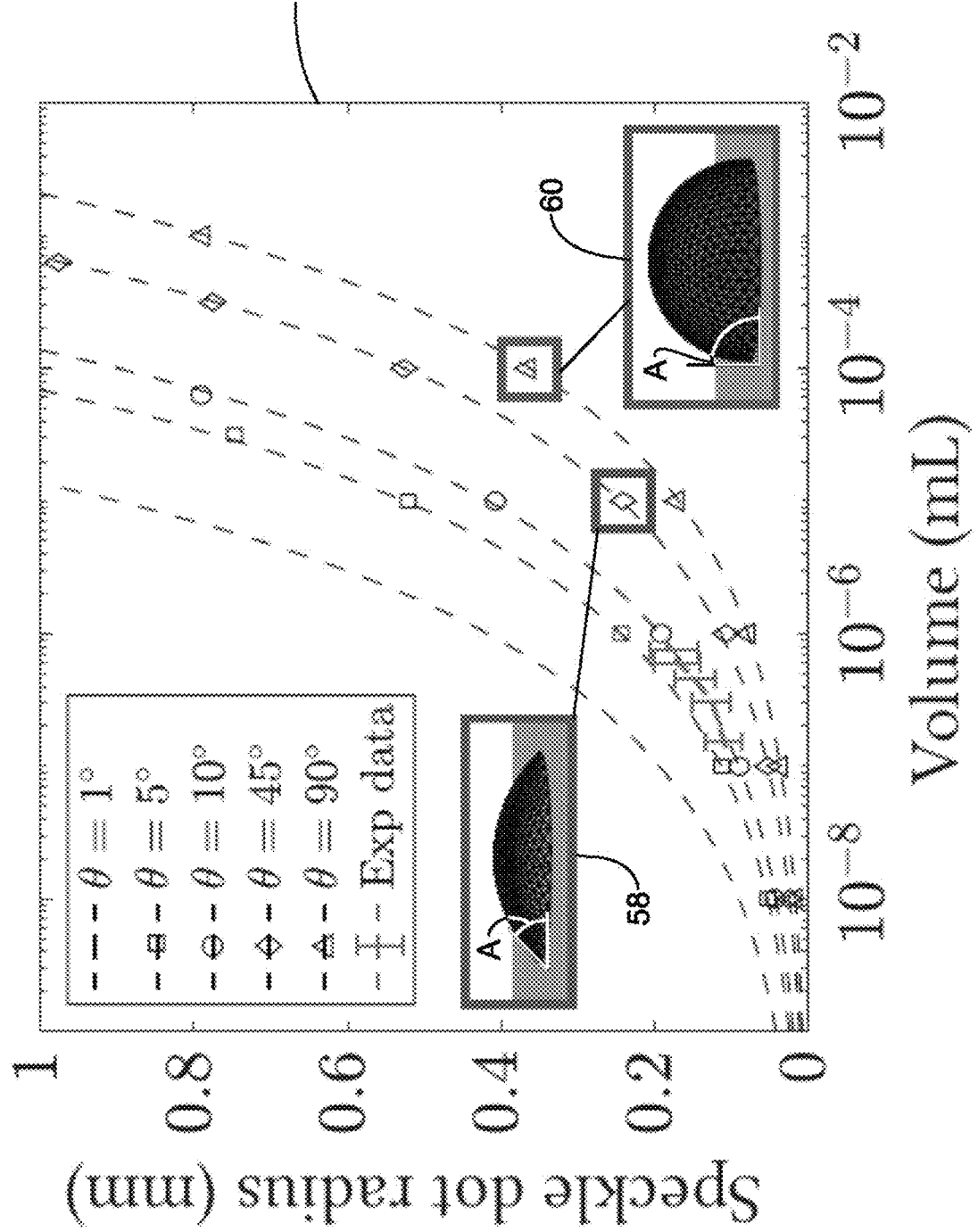
FIG. 8 is a schematic chart of illustrative values of speckle dot radii formed from different volumes of ink and having different contact angles.

Equation (1) is plotted in a chart 56 depicted in FIG. 8 with volume amount on the x-axis in milliliters (mL) and speckle dot radii size is on the y-axis in millimeters (mm). Equation (1) is plotted for five different contact angles, θ: 1°, 5°, 10°, 45°, and 90°. From FIG. 8, it can be seen that a radius of each dot may be proportional to a volume amount for a dot such that $r \propto V^{1/3}$. As such, and as seen from the chart 56 in FIG. 8, for a same volume amount, smaller contact angle ink may generate a larger radius individual speckle dot because the droplet may spread more on the sample surface. For clarity purposes, a radius of a final printed dot is considered to be the radius of the bottom contact area between the ink and the surface after the ink is dry.

In one example for verifying Equation (1), speckle dots were printed onto a polyurethane-based open-cell elastomeric foam (PORON XRD, Rogers, Conn.). The speckle dots were formed using a black acrylink (Liquitex Artist Materials, Piscataway, N.J.) outputted from a glass syringe (Hamilton, Franklin, Mass.) using a 3D printer system configured as discussed herein. The resulting dots of ink have a contact angle with a surface of the foam that is about 10°. The inner diameter of a needle of a syringe from which the ink is outputted is about 150 µm. The volume amount of ink outputted is varied from about $10^{-7}$ mL to about $10^{-6}$ mL. The volume amounts, along with positions/coordinates for all dots were set using G-code files readable by a controller of the 3D printer system. The coordinates were determined based on the designed Poisson disc sampling DIC patterns with a minimum distance requirement to ensure dots do not overlap each other. The experiment is summarized in FIG. 9.

Figure 9:
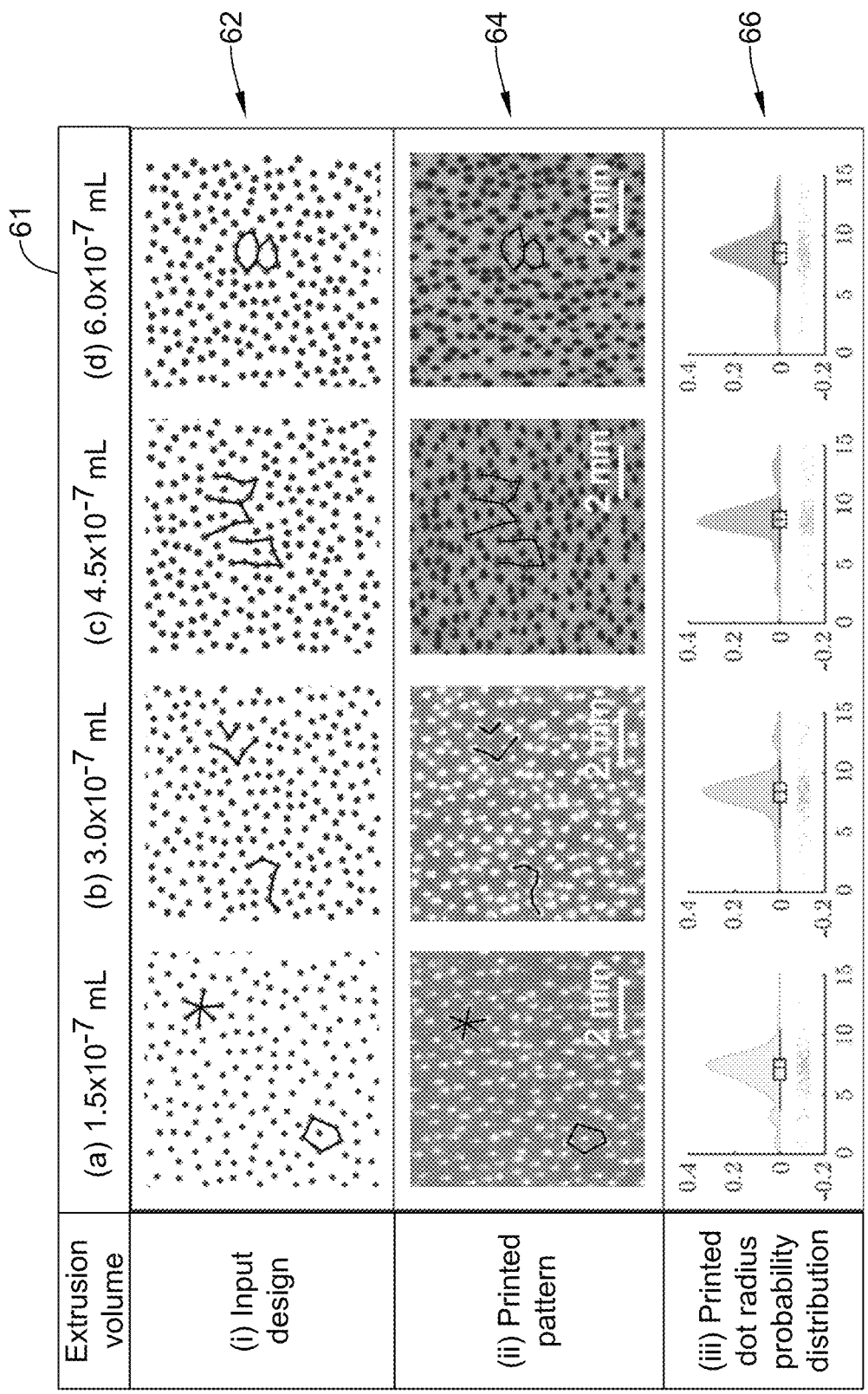
FIG. 9 is a schematic chart summarizing illustrative experimental dot pattern data.

The first row 62 in chart 61 of FIG. 9 depicts the determined positions for the dots based on the Poisson disc sampling DIC patterns, a volume amount for each dot (e.g., (a) $1.5\times10^{-7}$ mL, (b) $3.0\times10^{-7}$ mL, (c) $4.5\times10^{-7}$ mL, (d) $6.0\times10^{-7}$ mL), and a fixed spatial density of 0.25 dots per square inch. The patterns printed based on the determined positions shown in the first row 62 are depicted in a second row 64 of the chart 61. As can be seen from a visual comparison of the first row 62 to the second row 64, the printed dots are consistent with the originally designed patterns depicted in the first row 62. The radius (in pixels) of each dot in the second row 64 were extracted using an image post-processing system (i.e., an in-house MATLAB script) and the probability distributions of dot radii are summarized in a third row 66 depicted in the chart 61. As shown in the third row 66, the radii of the dots range from about 100 µm to about 200 µm and the printed dots had radii that agreed with the predicted radii from Equation (1).

In addition to printing dot patterns and/or other suitable patterns on flat surfaces using the 3D printer system 10, dot patterns and/or other suitable patterns may be applied to non-flat surfaces (e.g., angled, stepped, or rounded surfaces relative to a horizontal plane) using the 3D printer system 10. In one example, a designed pattern may be printed on a varying frequency sinusoidal shape surface of an object. To facilitate printing patterns on non-flat surfaces using the 3D printer system 10, the G-code and/or other computer readable instructions may be programed to print dots or other patterns on the non-flat sample surface.

A relative location of the top surface to which a patter is to be applied may be measured by techniques including, but not limited to, 3D surface scanning. Additionally or alternatively, a 3D model of the object may be utilized to determine locations of the top surface to which dots and/or other suitable patterns are to be applied. In some cases, the object having the surface on which the pattern is to be applied may be placed on a top of a cushioning substrate (e.g., a low-modulus elastomeric foam), which may result in the sample top surface automatically adjusting in a z-axis direction in response to a force on the surface of the object from the applicator 13 when time the applicator lowers (e.g., in the direction of arrow 48 in FIG. 3) down and contacts the surface causing the cushioning substrate to compress.

Figure 10:
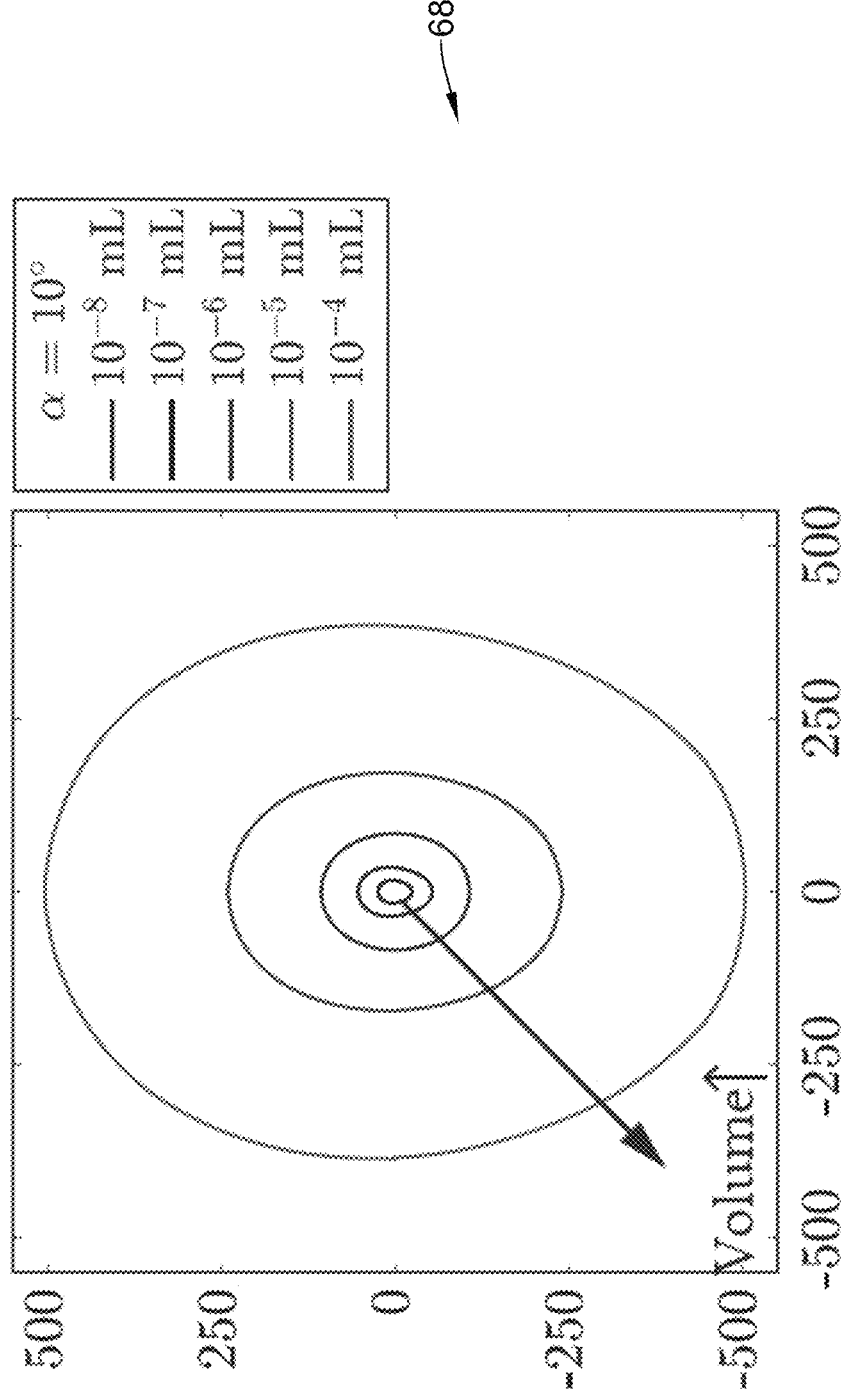
FIG. 10 is a schematic chart of illustrative dot shapes formed from different volumes of ink outputted onto a same-angled, non-flat surface.
Figure 11:
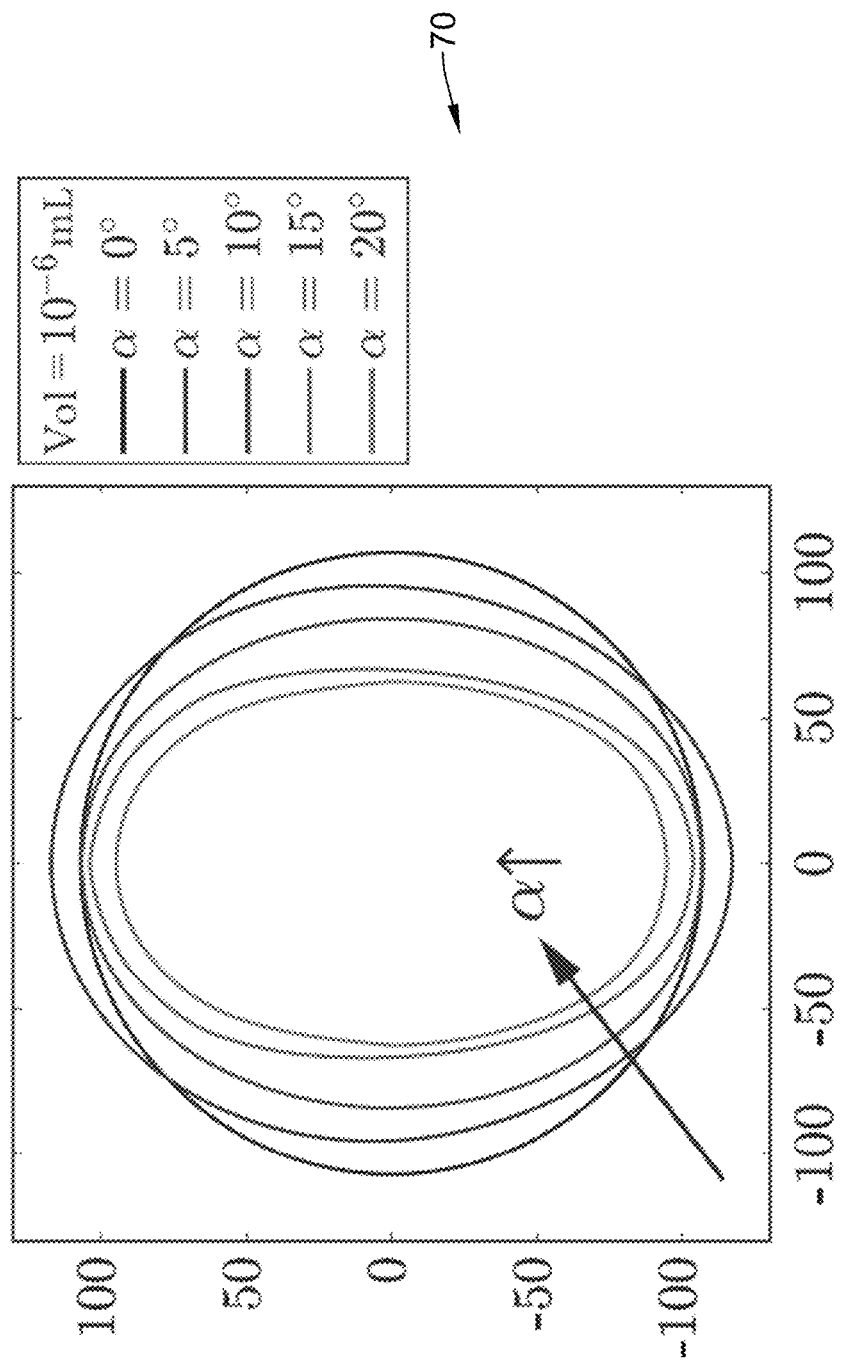
FIG. 11 is a schematic chart of illustrative dot shapes formed from same volume ink outputs that are outputted onto different-angled, non-flat surfaces.
Figure 12:
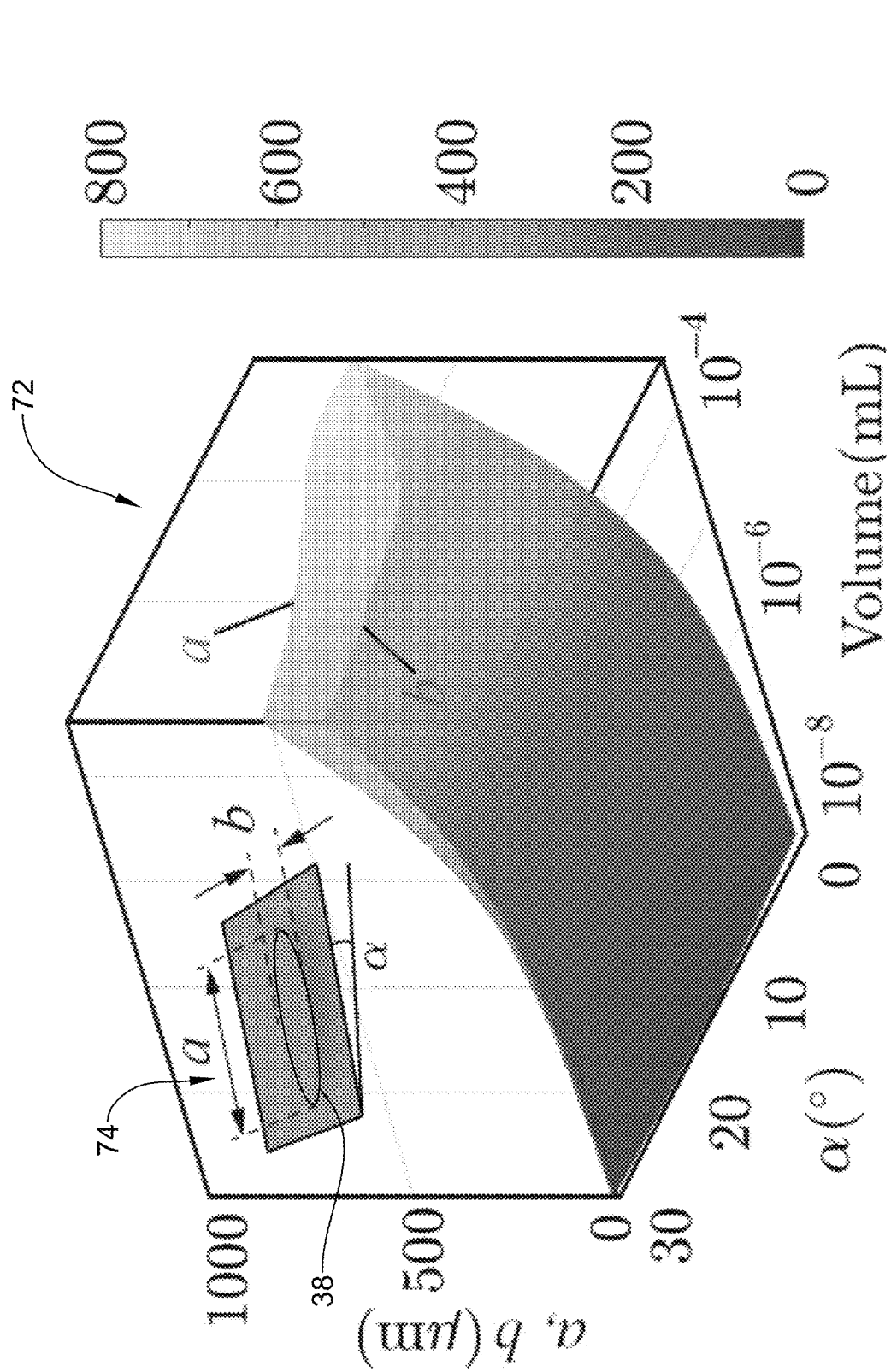
FIG. 12 is a schematic chart of illustrative data showing parameter values for printed ink dot shapes formed from different volumes of ink formed on different angled surfaces.

FIGS. 10-12 depict results of numerical simulations for providing dot patterns on non-flat surfaces showing the effects of surface slope and gravity on dot positioning and size that may be taken into account when printing patterns on non-flat surfaces. As shown in chart 68 of FIG. 10 depicting outlines of final dot shapes formed from various volume amounts, the results of the numerical simulations indicated that while the dot size increased with volume increases, dots applied to a same-angled non-flat surface have substantially the same shape independent of volume amount for the dot. As shown in chart 70 of FIG. 11 depicting outlines of final dot shapes formed at various angles of surfaces relative to a horizontal angle, the results of the numerical simulations verified that dots having a same volume amount that are applied to different angled non-flat surfaces changed shape with the different angled non-flat surfaces. For example, as shown in the chart 70, an eccentricity (eccentricity=1−b/a, where b and a are defined in FIG. 12) of the final dot shape appears to increase with increased angles of the non-flat surfaces. FIG. 12 depicts a chart 72 of eccentricity for the dots and indicates resulting eccentricity is less than 0.3 as long as the surface slope or angle is less than 30°. The inset chart 74 depicts a definition for b and a relative to a final shape of the ink dot 38, which are used in the eccentricity equation.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of applying a digital image correlation (DIC) pattern to a surface of a substrate, the method comprising:
    determining a three-dimensional coordinate for each of one or more locations at which ink is to be applied to a surface of a substrate to achieve a predetermined DIC pattern, the three-dimensional coordinates are determined based on a location of the surface of the substrate and the predetermined DIC pattern;
    adjusting a position of a printer head to a three-dimensional coordinate of a location of the one or more locations; and
    applying ink to the surface of the substrate at the three-dimensional coordinate using the printer head, the ink on the surface of the substrate having a dimension based on the predetermined DIC pattern.

2. The method as in claim 1, wherein the adjusting a position of a printer head to the three-dimensional coordinate of the location of the one or more locations and the applying the ink to the surface of the substrate at the three-dimensional coordinate are repeated for each of the one or more locations.

3. The method as in claim 1, wherein:
    the adjusting a position of the printer head to the three-dimensional coordinate of the location of the one or more locations of the predetermined DIC pattern includes adjusting the printer head to x-axis and y-axis coordinates and lowering the printer head to a z-axis coordinate; and
    the applying the ink to the surface of the substrate at the three-dimensional coordinate occurs when the printer head is adjusted to the x-axis coordinate, the y-axis coordinate, and the z-axis coordinate.

4. The method as in claim 1, wherein the applying the ink to the surface of the substrate at the three-dimensional coordinate includes applying a predetermined amount of ink to the substrate to achieve the dimension based on the predetermined DIC pattern.

5. The method as in claim 1, wherein the dimension of the ink on the surface of the substrate is a radius of a printed ink dot in a range of ten (10) micrometers-ten (10) millimeters.

6. The method as in claim 1, wherein the predetermined DIC pattern is a speckle dot pattern.

7. The method as in claim 6, further comprising:
    determining the speckle dot pattern based on optimization rules for the predetermined DIC pattern.

8. The method as in claim 7, wherein the optimization rules for predetermined DIC pattern include a predetermined dot diameter range and a predetermined dot coverage range for the surface of the substrate.

9. The method as in claim 6, wherein the one or more locations are locations of one or more dots of the speckle dot pattern and a center position of the one or more dots of the speckle dot pattern are configured to be distributed on a predetermined area of the surface of the substrate based on optimization rules.

10. The method as in claim 1, wherein the applying the ink to the surface of the substrate includes applying the ink to a flat surface of the substrate.

11. The method as in claim 1, wherein the applying the ink to the surface of the substrate includes applying the ink to a non-flat surface of the substrate.

12. A computer readable medium having stored thereon in a non-transitory state a program code for use by a computing device, the program code causing the computing device to execute a method of operating a three-dimensional printer system comprising:
    identifying a three-dimensional coordinate for a dot of one or more dots of a digital image correlation (DIC) pattern to be applied to a surface of a substrate;
    adjusting a position of a printer head to the three-dimensional coordinate of the dot of the one or more dots of the DIC pattern; and
    applying ink to the surface of the substrate at the three-dimensional coordinate using the printer head, the ink on the surface of the substrate has a dimension based on the DIC pattern.

13. The computer readable medium as in claim 12, wherein the method further comprises:
    providing the three-dimensional coordinate for each of the one or more dots of the DIC pattern based on a location of a surface of a substrate.

14. The computer readable medium as in claim 12, wherein:
    the adjusting the position of the printer head to the three-dimensional coordinate of the dot of the one or more dots of the DIC pattern includes adjusting the printer head to an x-axis and y-axis coordinates and lowering the printer head to a z-axis coordinate; and
    the applying the ink to the surface of the substrate at the three-dimensional coordinate occurs when the printer head is adjusted to the x-axis coordinate, the y-axis coordinate, and the z-axis coordinate.

15. The computer readable medium as in claim 14, wherein the method further comprises:
    raising the printer head from the z-axis coordinate after applying the ink to the surface of the substrate; and
    for each of the one or more dots of the DIC pattern, repeating the adjusting the position of the printer head to the three-dimensional coordinate of the dot of the one or more dots of the DIC pattern, the applying the ink to the substrate at the three-dimensional coordinate, and the raising the printer head from the z-axis coordinate after applying the ink to the substrate.

16. The computer readable medium as in claim 12, wherein the applying the dot of ink to the substrate at the three-dimensional coordinate includes applying a predetermined volume of ink to the substrate to achieve the dimension based on the DIC pattern.

17. The computer readable medium as in claim 12, wherein the applying the ink to the surface of the substrate includes applying the ink to a non-flat surface of the substrate.

18. The computer readable medium as in claim 17, wherein the method further comprises:
adjusting a position of the substrate in a z-axis direction when the ink is to be applied to the non-flat surface of the substrate.

19. A three-dimensional printing system comprising:
a printer head comprising a syringe configured to hold ink;
a structure configured to hold a substrate to which the ink from the syringe is to be applied;
a processor; and
memory configured to store in a non-transitory state instructions executable by the processor to cause the processor to:
adjust a position of the printer head to a three-dimensional coordinate of a dot of one or more dots of a digital image correlation (DIC) pattern to be applied to a surface of the substrate; and
apply ink to the surface of the substrate at the three-dimensional coordinate using the printer head, the ink on the surface of the substrate having a dimension on the surface of the substrate based on the DIC pattern.

20. The system as in claim 19, wherein the dimension of the ink on the surface of the substrate is a radius in a range of ten (10) micrometers-ten (10) millimeters.

* * * * *